Sept. 10, 1935.  A. O. SAMUELS  2,014,146
NONTWISTING EXTENSION CORD FOR ELECTRICAL DEVICES
Filed Dec. 11, 1934
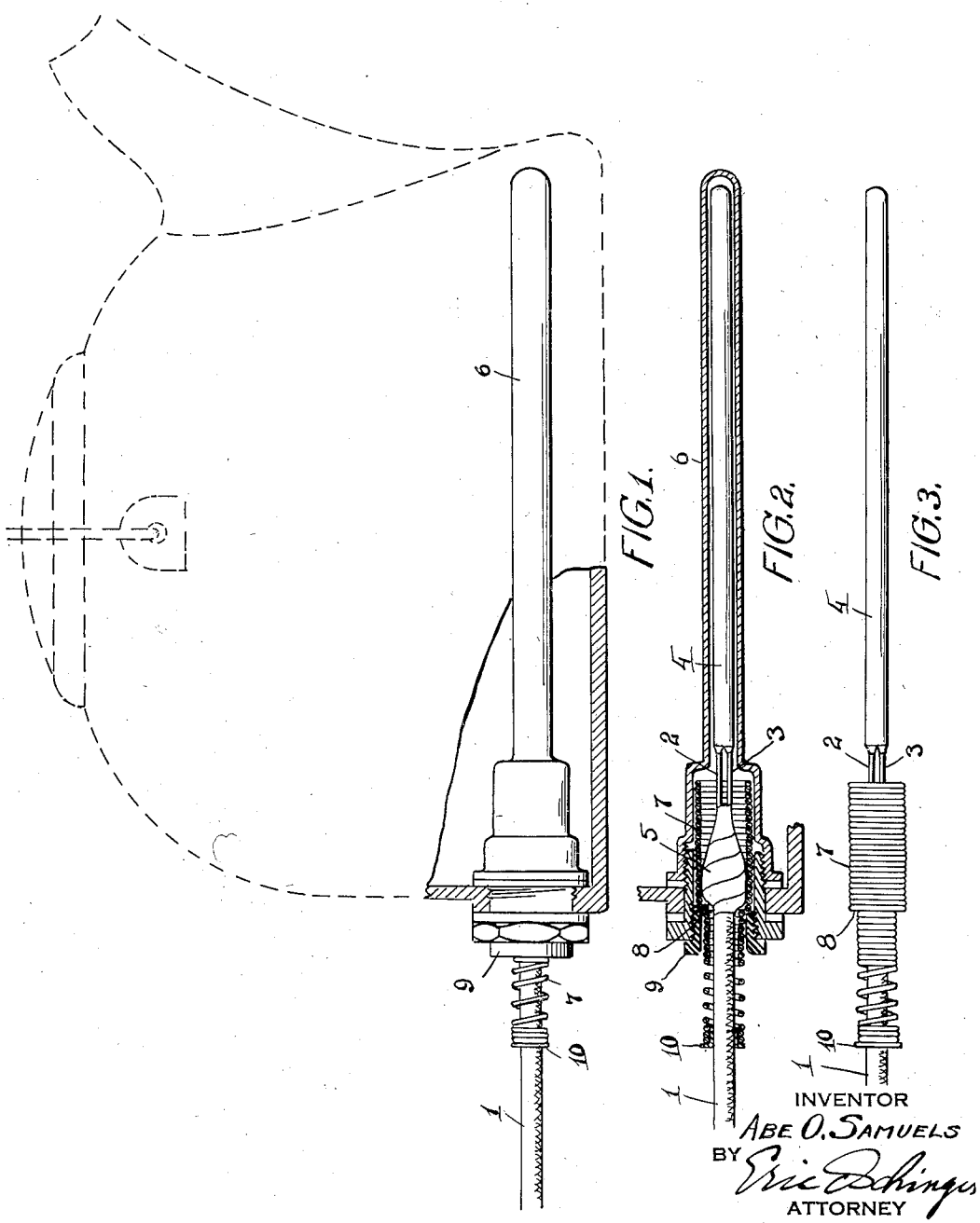
INVENTOR
ABE O. SAMUELS
BY
ATTORNEY Patented Sept. 10, 1935

2,014,146

UNITED STATES PATENT OFFICE 2,014,146

NONTWISTING EXTENSION CORD FOR ELECTRICAL DEVICES

Abe O. Samuels, Rochester, N. Y., assignor to Samson-United Corporation, Rochester, N. Y.

Application December 11, 1934, Serial No. 756,912

8 Claims. (Cl. 219—44)

This invention relates to electrical extension cord connections for electrical heating devices and apparatus and has for its object to provide an extension cord connection in combination with the electric heating unit or other electrically operated member and its mounting in the device or apparatus which will prevent the extension cord from twisting and kinking when the device or apparatus is moved in the use thereof.

Another object of this invention is to so construct the non-twisting extension cord connection that it will function whether the extension cord is under tension or not.

These and other objects and attendant advantages will become more readily apparent from the detailed description of the invention which follows, reference being had to the accompanying drawing in which Figure 1 is a side elevation of an electrically heated tea kettle provided with the non-twisting extension cord connection.

Figure 2 is a sectional view of the electric heater with a portion of the tea kettle and the nontwisting extension cord connection therefor.

Figure 3 is a detail view of the electrical heating unit, its connection to the extension cord and its non-twisting mounting member.

In the several figures of the drawing like reference numerals indicate like parts.

In the use of electrically heated devices and apparatus it is necessary to move them at the end of their electrical extension cords and this has heretofore caused such extension cords to be turned axially so that the wires within the cord were twisted and became kinked until one or both of the wires were finally broken and provided either a broken or a short circuit in the electrical connection.

This trouble in extension cord connections for electrical devices and apparatus has been entirely eliminated in my present invention which is illustrated as applied to an electrically heated tea kettle although it is understood that it may be used in combination with other electrical devices and apparatus without departing from the spirit and scope of the invention.

In my invention the electrical extension cord 1 is suitably connected to the lead wires 2 and 3 of the electric heating unit 4. The electrical joints between these wires and the cord are taped to provide the knot 5 at the junction between the extension cord and the lead wires of the heating unit. The heating unit 4 is supported on the end of the lead wires 2 and 3 and its insulated shell is free within the heater tube 6 of the kettle.

A portion or all of the lead wires 2 and 3 and their connection to the extension cord together with a portion of the extension cord are surrounded by the bearing sleeve or tubing 7 which, in this instance, is illustrated as being made up in the form of a flexible spring in order to reduce any frictional contact with its outer surface to a minimum and permit a free axially floating movement thereof within the heater tube 6. The inside diameter of the tubing 7 is such that it encircles the knot 5 formed between the extension cord and lead wires and is frictionally in contact therewith to hold the lead wires 2 and 3 and the cord connected to them in fixed relation thereto. The outer end of the tubing 7 is reduced in diameter so as to provide an annular shoulder 8 on the flexible spring tubing within the heater tube 6. The end of a bushing 9 provides an end thrust bearing for the shoulder 8 of the tubing 7 when the extension cord is drawn away from the heater tube and forces the shoulder against the end of the bushing as the result of it.

The bushing 9 is threaded or otherwise suitably fastened into the end of the heater tube 6 and the reduced portion of the tubing is free to axially rotate therein. On the outside of the bushing 9 the reduced portion of the tubing is expanded longitudinally so as to encircle the extension cord beyond the bushing and provide a flexible support for the extension cord which keeps it from bending at too sharp an angle at the entrance into the heater when the kettle is held at an angle to the extension cord. An eyelet 10 is suitably fastened to the end of the reduced portion of the tubing to provide a smooth finish for the end of the tubing and reduce its frictional contact with the outer surface of the extension cord to a minimum.

From the foregoing it will be apparent that when the kettle is moved and the heater tube 6 moves with it, the axially floating support of the heating unit provided by the tube 7 in the heater tube 6 permits the heating unit and the extension cord connected to it to remain axially stationary while the bushing 9 holds the tubing 7 longitudinally in place in the heater tube 6 by the engagement of its inner end with the annular shoulder 8. When a pull on the extension cord away from the heater tube is exerted thereon the shoulder 8 of the tubing 7 provides a thrust bearing for this tubing which permits an axial movement of the heater tube while the tubing 7 with the extension cord remains stationary. No matter whether the extension cord is held loose or taut the tubing 7 and the heating unit are therefore always axially floating in the heater tube 6 so that when the heater tube is axially rotated in the use of the electrically heated device or apparatus the heating unit and its extension cord connection are free to remain stationary.

I claim:

1. A non-twisting extension cord connection for an electric heating unit of an electric device or apparatus having a heater tube, said connection comprising a tubing extending into said heater tube and held axially floating therein, an extension cord extending into said tubing into frictional contact therewith and having said heating unit and extension cord axially floating in the heater tube therewith.

2. A non-twisting extension cord connection as set forth in claim 1 with means provided with said tubing to keep said extension cord from pulling out of one end of said tubing.

3. A non-twisting extension cord connection as set forth in claim 1 with a flexible extension provided on said tubing on the outside of said heater tube to yieldingly support the extension cord at its entrance into said heater tube.

4. A non-twisting extension cord connection as set forth in claim 1 with an annular shoulder formed on said tubing and means provided in said heater tube for engaging said annular shoulder to hold said tubing against endwise movement in said heater tube while axially floating therein.

5. In a non-twisting extension cord for electrical devices having a heater tube, the combination of a tubing adapted to project into the heater tube, an extension of reduced diameter provided on said tubing to form a shoulder thereon within said heater tube, a thrust bearing in said heater tube and engaging said shoulder to hold said tubing in place in said heater tube while axially floating therein and the tubing drawn against said thrust bearing.

6. In a non-twisting extension cord mounting for electrical devices having a heater tube, the combination of a tubing mounted to axially float in the heater tube, an extension of reduced diameter formed on said tubing, a bushing surrounding said reduced extension and held in place in said heater tube to hold said tubing longitudinally in place in said heater tube with the tubing and its extension axially floating in said heater tube.

7. In a non-twisting extension cord connection as set forth in claim 6 in which the extension is made flexible so as to flexibly support the axially floating extension cord leading into the bearing sleeve.

8. In a non-twisting extension cord connection for electrical devices having a heater tube, the combination of a tubing adapted to axially float in said heater tube, means provided on said tubing to hold the extension cord entering said tubing out of frictional contact with the heater tube.

ABE O. SAMUELS.